United States Patent [19]

Courier de Mère

[11] 4,264,971
[45] Apr. 28, 1981

[54] CONVERTER DEVICES

[75] Inventor: Henri E. F. M. Courier de Mère, Paris, France

[73] Assignee: Bicosa Societe de Recherches, Clichy, France

[21] Appl. No.: 410,225

[22] Filed: Oct. 26, 1973

Related U.S. Application Data

[63] Continuation-in-part of Ser. No. 325,891, Jan. 22, 1973.

[30] Foreign Application Priority Data

Oct. 26, 1972 [FR] France ............................... 72 38011
Oct. 2, 1973 [FR] France ............................... 73 35152

[51] Int. Cl.³ ......................................... H02M 3/335
[52] U.S. Cl. ...................................... 363/18; 363/20; 331/113 R
[58] Field of Search ................. 321/2, 43; 323/17, 18, 323/DIG. 1, 82, 89 C; 331/113 R, 113; 363/18, 19, 20

[56] References Cited

U.S. PATENT DOCUMENTS

| | | | |
|---|---|---|---|
| 2,866,943 | 12/1958 | Ringelman | 323/89 C X |
| 3,130,349 | 4/1964 | Mallory | 331/113 R X |
| 3,240,989 | 3/1966 | Grunwaldt | 331/113 X |
| 3,404,311 | 10/1968 | Ruppert | 331/113 R X |
| 3,523,211 | 8/1970 | Oishi et al. | 315/209 CD |
| 3,596,133 | 7/1971 | Warren et al. | 315/209 CD |
| 3,619,758 | 11/1971 | Deranian | 321/2 |
| 3,629,683 | 12/1971 | Nuckolls | 321/2 |
| 3,639,826 | 2/1972 | Grundberg | 321/2 |
| 3,771,040 | 11/1973 | Fletcher | 323/DIG. 1 |

*Primary Examiner*—William M. Shoop
*Attorney, Agent, or Firm*—Michael J. Striker

[57] ABSTRACT

The converter device transforms a changing direct signal generated by a source of direct current, into a signal whose amplitude is substantially greater than that of said changing signal, at least for certain values of this signal. It comprises a first transistor, an inductance with a high overvoltage coefficient wound on a core of ferrite and arranged in the collector circuit of said first transistor, so that one terminal of this inductance is directly connected to the collector of said transistor, a second transistor of which the collector is directly connected to the base of the first transistor, a connecting capacitor between the collector of the first transistor and the base of the second transistor, and a polarizing resistance arranged between the base of the second transistor and one terminal of said source.

17 Claims, 5 Drawing Figures

CONVERTER DEVICES

CROSS-REFERENCE TO RELATED APPLICATION

The present application is a continuation-in-part of my copending application Ser. No. 325,891, filed Jan. 22, 1973.

The invention relates to a converter device adapted to transform a changing continuous signal, generated by a source of continuous current such as a battery into a signal whose amplitude is substantially greater than that of said changing continuous signal, at least for certain values of this signal. It relates, more particularly, to such a converter device which comprises at least one transistor. Said signal produced by the converter device is either a periodic signal or a continuous signal.

Converter devices of this type are already known in which the continuous signal is first transformed into an alternating signal by means of an oscillator assembly comprising at least one transistor then amplified by means of a transformer raising the voltage produced by said oscillator assembly. The principal drawback of these known converter devices is that the transformer is difficult to construct and has an inconvenient bulk.

It is an object of the invention to overcome the above-mentioned drawbacks. It is a further object of the invention to enable the production of such converter device which is simple and economic and which can be produced in the form of a circuit with a reduced number of components.

It is another object of the invention to provide a converter device which enables for a given type of battery, the prolongation of its useful life by regulating its voltage to a constant value at least equal to its nominal value.

Yet another object of the invention is provide such a converter whose yield is high and which enables a direct current to be delivered which is indeed of constant level.

The converter device according to the invention is characterised by the fact that it comprises, in combination, a first transistor, an inductance with a high overvoltage coefficient preferably wound on a ferrite core and arranged in the collector circuit of this first transistor, so that one terminal of this inductance is connected directly to the collector of said transistor, a second transistor whose collector is connected directly to the base of the first transistor, a linking capacitor between the collector of the first transistor and the base of the second transistor and a polarising resistance arranged between the base of the second transistor and one terminal of the direct current source.

The source of continuous current is, in the preferred embodiment of the invention, constituted by a single element battery.

In the case where the inductance is constituted by a coil wound on a ferrite core, this core constitutes, advantageously, a closed circuit having, preferably, the shape of a torus.

In a particularly advantageous embodiment of the converter device, according to the invention, the latter comprises a second capacitor, rectifier means for charging this second capacitor by the signal delivered to the terminals of said inductance, and regulator means, comprising preferably a Zener diode, to interrupt the production of an alternating signal at the terminals of said inductance when the charge of the second capacitor reaches a given threshold value. Preferably, the said Zener diode is arranged between a plate of the second capacitor on the base of the second transistor.

Other objects, features and characteristics according to the invention will appear also in the course of the more detailed description of preferred embodiments of the invention which follows and in which reference is made to the accompanying drawings in which.

Figure 1:
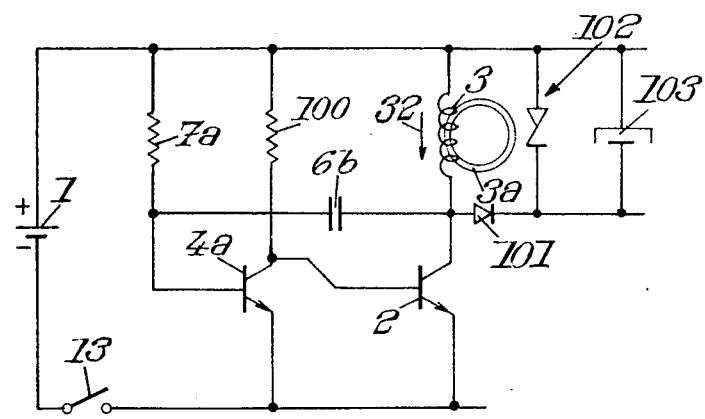
FIGS. 1 to 3 show embodiments of converter devices according to the invention arranged to deliver a continuous signal.
Figure 2:
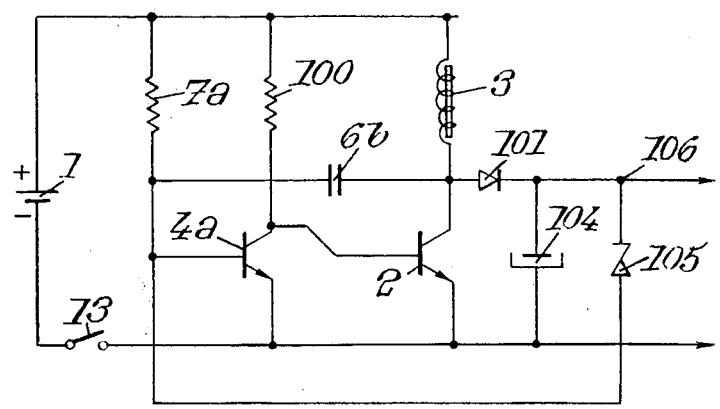
Figure 3:
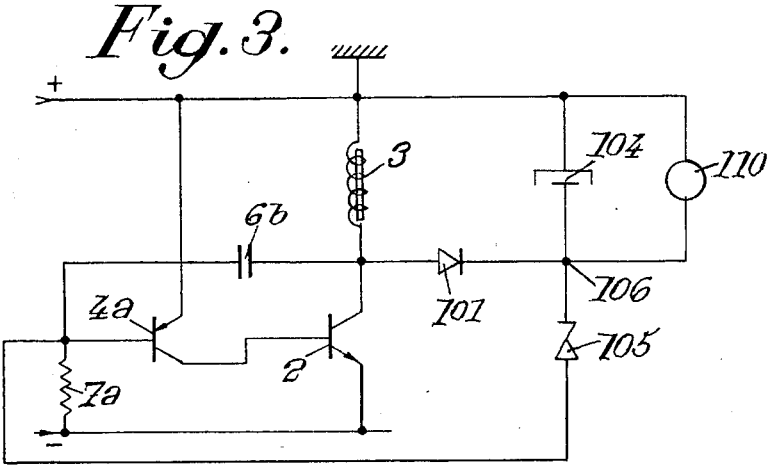
Figure 5:
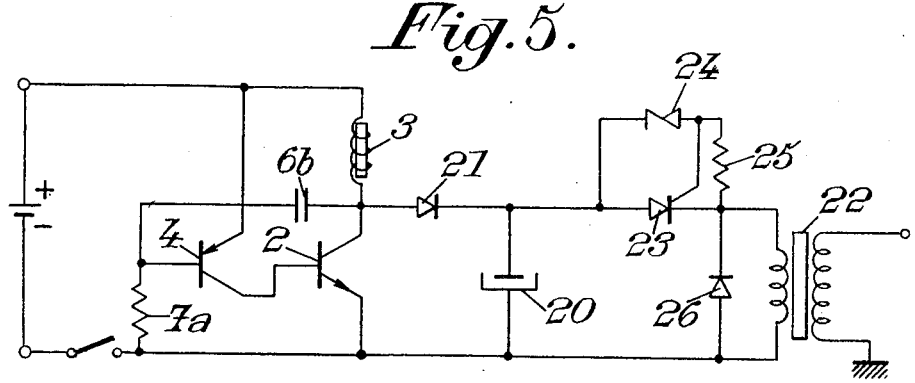

The converter devices shown in FIGS. 1 to 3 and in FIG. 5 comprise, a source of direct current 1 such as a battery, a first transistor 2, which is of the NPN conductivity type in the examples, and an inductance 3, with a high overvoltage coefficient, arranged between the positive pole (+) of the source 1 and the collector of the transistor 2. This inductance is, preferably, constituted by a coil wound on a ferrite core and this ferrite core has, advantageously, the shape of a closed circuit, a torus 3a, in the embodiment shown in FIG. 1.

These converters comprise a second transistor 4a and a polarising resistance 7a arranged between the base of the transistor 4a and one terminal of the source 1. Moreover, a capacitor 6b is installed between the collector of the transistor 2 and the base of the transistor 4a. The collector of the transistor 4a, lastly, is connected directly to the base of the transistor 2.

In the converter devices shown in FIGS. 1 and 2, the transistor 4a is of the same type of conductivity (NPN) as the transistor 2. Moreover, a second resistance 100 for polarisation is installed between the collector of the transistor 4a and the positive terminal of the source 1.

In the examples of FIGS. 1 and 2, the first polarising resistance 7a is connected between the base of the transistor 4a and the terminal (+). The emitter of the transistors 2 and 4a are connected to the negative pole (−) of the source 1 through a switch 13.

The inventor has noticed that there is obtained, at the collector of the transistor 2, an alternating voltage of high amplitude, substantially greater than the amplitude of the voltage supplied by the source 1. The source 1 is advantageously, a single element battery.

In a particular embodiment of the device according to the invention, the resistance 7a has the value of 1 megohm, the resistance 100 the value of 5 kohms, the capacitor 6b has a capacity of 22 picofarads, the inductance 3 has a value of 10 millihenrys and, the coefficient of overvoltage Q of this inductance has substantially the value 100.

Without wishing to limit the invention to a particular theory, it is believed that the operation of this portion of the device which has just been described is as follows:

When the switch 13 is closed, the base of the transistor 2 is connected to the positive pole of the source 1 through, the resistance 100. Through this fact, the transistor 2 is conductive and an electrical current is established therefore in the inductance 3 and between the collector and the emitter of the transistor 2, in the direction of the arrow 32. According to Lenz's law, an electromotive force opposing this current is created at the terminals of the inductance 3; this electromotive force confers a positive potential on the collector of the transistor 2. This positive potential is transmitted, through the capacitor 6b, to the base of the transistor 4a; the latter then passes into the conductive state (the resistance 7a having a high value, the base-emitter current of this transistor has, at the origin, a value insufficient to render the latter conductive). The transistor 4a then being conductive, the base of the transistor 2 occurs at the potential of the negative terminal of the source 1. Thus, said transistor 2 passes to the blocked state, enabling, then, the return of the transistor 4a to the blocked state, and thus, a current can circulate between the base and the emitter of the transistor 2, so unblocking the latter transistor. It is seen that—since it has returned to the initial state—the phenomena recommences periodically and an alternating voltage is obtained at the terminals of the inductance 3.

According to another aspect of the invention, which is applied both in the case where the two transistors 2 and 4a are of the same type of conductivity as in the case where these transistors are of opposite conductivity type, the converter device comprises (FIGS. 1 to 3) rectifier means 101 to rectify the signals delivered at the terminals of the inductance 3 and regulator means to regulate the signal supplied by said rectifier means.

In the embodiment of the invention which is shown in FIG. 1, the rectifier means comprise a diode 101 whose anode is connected to the collector of the transistor 2, and the regulator means comprise a Zener diode 102 whose cathode is connected to the cathode of the diode 101 and whose anode is connected to the terminal of the inductance 3 which is opposite the collector of the transistor 2. Also, in this embodiment of the invention, which is shown in FIG. 1, a filtering capacitor 103 is installed at the terminals of the Zener diode 102.

In the embodiment which is shown in FIG. 2, the abovesaid rectifier means comprise also a diode 101 whose anode is connected to the collector of the transistor 2, but the regulator means are constructed differently enabling a high yield from the converter device. In this embodiment, there is provided a capacitor 104 arranged between the cathode of the diode 101 and the emitter of the transistor 2, and a Zener diode 105. The cathode of this Zener diode 105 is connected to the point 106 common to the diode 101 and to the capacitor 104 and the anode of this Zener diode 105 is connected to the base of the transistor 4a.

In the example illustrated in FIG. 3 (in which the transistors 2 and 4a are of opposite conductivity types, the transistor 4a being of the type PNP) there is provided, an in the case of FIG. 2, capacitor 104 and a Zener diode 105. However, in this case, the plate of the condensor 104 which is not connected to the cathode of the diode 101 is connected to the terminal of the inductance 3 which is opposite the collector of the transistor 2.

In the embodiment of the invention which is shown in FIG. 1, the Zener voltage of the Zener diode 102 is so selected that it is less than the maximum value of the signal delivered to the terminals of the inductance 3. This Zener diode 102 thus operates as a peak limiter. This Zener voltage will however be chosen at a value substantially higher than that of the continuous voltage supplied by the battery 1.

In the embodiment of FIGS. 2 and 3, the signal rectified by means of the diode 101 is used to charge the capacitor 104. As soon as the charge on this capacitor 104 has reached a given value, that is to say as soon as the potential of the point 106 has reached a given value, equal to the Zener voltage of the Zener diode 105, this diode becomes conducting and prevents the supply of an alternating signal at the terminals of the inductance 3. In fact, in the case of FIG. 2, the positive voltage of the point 106 is applied to the base of the transistor 4a by means of the Zener diode 105; for this reason, the transistor 4a is kept in the conductive state which blocks the transistor 2. When the potential of the point 106 is less than the Zener voltage of the diode 105, for example due to the fact of the discharge of the capacitor 104 into a charge 110, the signal can be supplied to the terminals of the inductance 3 and thus enable the charging of the capacitor 104. There is hence obtained good regulation of the voltage at the terminals of the capacitor 104. In other words, there is obtained, at the terminals of the capacitor 104 a continuous voltage having a well-determined value.

In the example of FIG. 3, operation is substantially the same as in that of FIG. 2. However, when the potential of the point 106 reaches the Zener voltage of the diode 105 the positive potential is transmitted to the base of the capacitor 4a blocks the latter transistor so as to block the transistor 2 and prevent the supply of a signal to the terminals of the inductance 3.

With the latter arrangement, when the source 1 is a single element battery, there is obtained a continuous voltage of constant value during the whole duration of use of the battery. Furthermore, it is important to note that, due to the fact that the value of the signal obtained at the terminals of the capacitor 104 (in the case of FIGS. 2 and 3) or at the terminals of the Zener diode 102 (FIG. 1) is less than the amplitude of the signal delivered at the terminals of the inductance 3, the duration of use of the battery is important since, even when the voltage supplied by the battery 1 diminishes (generally at the end of the use of this battery) the signal delivered by this converter device always retains the same value.

Figure 4:
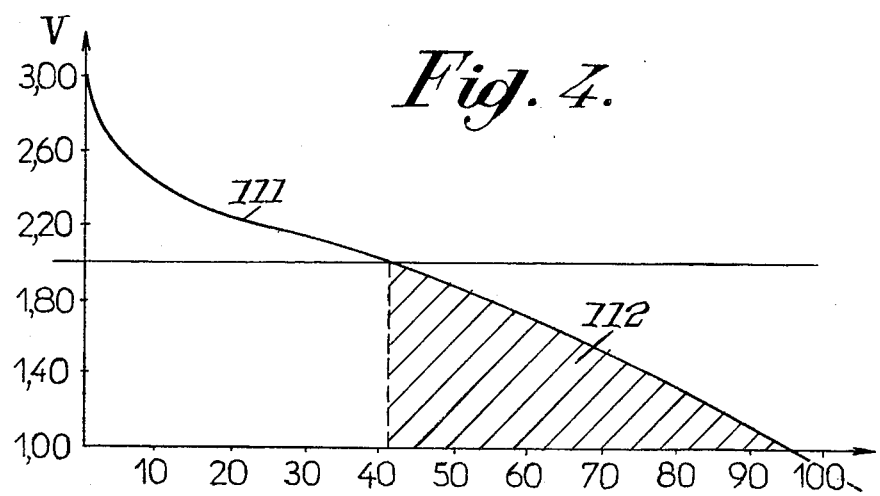
FIG. 4 is a diagram illustrating certain advantages of the converter devices shown in FIGS. 1 to 3 and FIG. 5 shows, according to the invention, an embodiment of a converter device adapted to transform a changing continuous signal into a periodic signal formed of pulses of amplitude notably higher than that of said continuous signal.

This advantage is even more distinct in the case where the battery 1 is a battery whose voltage diminishes in a regular manner. This case is illustrated in FIG. 4 in which there are plotted as ordinates the voltage V obtained at the terminals of a battery comprising two alkali-manganese elements assembled in series and, as abscissae, the duration of use, in hours, of said battery. The curve 111 represents the discharge of this battery for a current of given intensity. If the converter device, according to the invention, can still deliver a voltage at a fixed value when the battery only delivers a voltage less than 2 volts it is seen (hatched zone 112) that the duration of use of the battery can be doubled.

Another advantage of the converter device according to the invention, which is particularly appreciable in the case of portable equipment, is that (whatever the embodiment of this converter) for a given capacity, the volume occupied by the supply means in an apparatus supplied with continuous current can be reduced in considerable proportions. It may also be noted that, for a given volume, the converter device, according to the invention, enables the obtaining of a large capacity. In fact, for a given capacity, a single element battery, supplying a relatively low continuous voltage (for example 1.5 volts), occupies a substantially more reduced volume than an assembly of elements of batteries of the same capacity but supplying a substantially greater continuous voltage; a converter device according to the invention which enables the advantageous replacement of the supply by an assembly of batteries by supply by means of a single low voltage battery.

The converter device shown in FIG. 5 is intended to produce pulses of high amplitude at a well-determined frequency.

The pulses which appear on the collector of the transistor 2 are, in this embodiment used for charging a capacitor 20 through a diode 21. The capacitor 20 is charged to the maximum voltage reached by the pulses produced on the collector of the transistor 2, or to a fraction of the latter, and it is intended, as soon as its charge has reached a given value, to be discharged into the primary of a voltage step-up transformer 22 at the terminals of the secondary of which are produced said pulses of high amplitude and of a given frequency.

To obtain this result, there is provided a thyristor 23 in series with the primary of the transformer 22 in order to close the discharge circuit of the capacitor 20 and a Zener diode 24 whose anode is connected to the trigger of the thyristor 23 and of which the cathode is connected to the terminal, to the capacitor 20 and to the anode of the thyristor 23. Moreover, a resistance 25 is connected between the trigger and the cathode of the thyristor 23. A diode 26, lastly, is connected in parallel on the primary of the transforer 22 so that its cathode is connected to the cathode of the thyristor 23. This diode 26 constitutes a safety device intended to protect the thyristor 23 against overvoltages to which the latter can be subjected.

The arrangement which has just been described of the discharge circuit of the capacitor 20, enables the thyristor 23 to be rendered conductive for a well-determined charging voltage of said capacitor or, in other words, to obtain the discharge of this capacitor 20 into the primary of the transformer 22 as from a well-determined value of its charge. Since the voltage itself for triggering a thyristor is, generally, variable from one thyristor to another, by using a Zener diode 24, this imprecision is avoided since the voltage as from which the capacitor 20 is discharged is determined as a function of the priming voltage of the Zener diode 24 whose value is, by construction, well-determined. In order that the Zener diode 24 may be able to be conducting, the latter must have a priming voltage less than the maximum charging voltage of the capacitor 20.

The frequency of the pulses supplied at the secondary of the transformer 22 is determined essentially by the value of the priming voltage of the Zener diode 24. In addition, in order to produce pulses of maximum amplitude at the secondary of the transformer 22, the capacity C of the capacitor 20 and the inductance L of the primary winding of the transformer 22 are selected so that they obey the relationship:

$$LC\omega^2 = 1$$

in which formula $\omega = 2\pi f$, f being the abovesaid frequency determined by the value of the priming voltage of the Zener diode 24. In other words, the capacitor 20 and the primary of the transformer 22 form a circuit resonating at frequency f.

The converter device shown in FIG. 5 can be for example used to create pulses of high amplitude and of relatively low frequency. A particular application is the creation of pulses in the conductive wire of fencing which has to enclose a field of cattle. It will be noted that, for the latter application, there is then no need for the conductive wire of the fencing to be connected to an electrical energy supply line and the bulk of the device is notably reduced with respect to that presented by the conventional device.

Among the modifications of the device shown in FIGS. 1 and 2 it can be indicated that the transistors 2 and 4a which are, in the example shown, of the NPN type may be replaced by transistors of the opposite conductivity type, namely the PNP type. In this case, the resistances 7a and 100 would be of course, connected to the negative terminal (−) of the battery 1.

The converter device which has just been described with relation to FIGS. 1 and 3 and FIG. 5 has, in addition to those which have already been mentioned, numerous advantages. Among these advantages, it should be pointed out that this assembly comprises a very much reduced number of elements, which renders its production inexpensive and its bulk not cumbersome. Moreover, the values of the elements (resistances and capacitor) which compose this converter device may be selected within a large range of values; in other words, it is not necessary to select components of high precision.

Experience has shown that, by reason, especially, of the presence of the capacitor 6b, the frequency of operation of the converter device according to the invention was stable and well-determined. Moreover, if the capacitor 6b has an adjustable capacity the said frequency can be changed. Experience has also shown that there appeared a negative peak of current which was of negligible value. Through this fact, when the rectifier means are constituted by a simple diode 101, there is not loss of energy on rectification.

Moreover, the converter device according to the present invention has a power factor close to 1. It was noted that, even for low power, this yield was greater than 85%. It was also noted that the signal produced at the terminals of the inductance 3 could have a high value. This voltage signal can reach the value of 500 volts; it is necessary of course, in this case, to select the transistor 2 in a suitable manner.

By means of regulator means of the type of those which have been described with relation to FIGS. 2 and 3, for a voltage variation of the battery 1 by a factor 2 there is obtained a variation of 0.5% of the output voltage of the converter device according to the invention.

Lastly, the converter device according to the invention enables, when it is supplied by a battery, the use of almost the whole of the energy contained in said battery, by regulating the voltage of the battery to a constant value at least equal to its nominal value, which enables premature placing out of service of the battery to be avoided, starting from a critical voltage which, hitherto, could be fixed at two-thirds of the nominal voltage (for example 0.9 V for a battery of nominal voltage 1.5 V).

I claim:

1. Converter device adapted to transform a first signal, generated by a source of direct current having a first and a second terminal, into a second signal having an amplitude substantially greater than that of said first signal, at least for certain values of said first signal, and comprising a first transistor having its emitter connected in operation to said second terminal of said source, an inductance with a high overvoltage coefficient with one terminal directly connected to the collector of said first transistor and the other terminal connected to said first terminal of said source, a second transistor having its collector directly connected to the base of said first transistor and its emitter connected in operation to one of said terminals of said source, a connecting capacitor having first and second terminals, the first terminal being directly connected to the collector of said first transistor and the second terminal being directly connected to the base of said second transistor, and a polarizing resistor connected directly between the base of said second transistor and the terminal of said source which is not connected to the emitter of said second transistor.

2. Converter device according to claim 1, wherein said first and second transistors are of the same conductivity type and the emitter of said second transistor is connected to the second terminal of said source and which further comprises a second polarizing resistor arranged between said first terminal of the source and the base of said first transistor.

3. Converter device according to claim 1, wherein said source is constituted by a single element battery.

4. Converter device according to claim 1, comprising a second capacitor, means for charging this said second capacitor by the signal delivered by said inductance, a circuit for discharging said capacitor comprising in series a thyristor and the primary winding of a transformer, a Zener diode whose critical voltage is less than the maximum charging voltage of said second capacitor, said Zener diode being connected between the anode and the trigger of said thyristor with its anode connected to said trigger and its cathode to the anode of said thyristor, and a resistor connected between the trigger and the cathode of said thyristor.

5. Converter device according to claim 1, comprising rectifier means for rectifying the signal delivered at the terminals of the inductance and regulator means for regulating the signal delivered by said rectifier means.

6. Converter device according to claim 5, wherein the regulator means comprise a capacitor and a Zener diode having its cathode connected to one terminal of said capacitor of the regulator means and its anode connected to the base of said second transistor.

7. Converter device adapted to transform a first signal, generated by a single element battery source having a first and a second terminal into a second signal having an amplitude substantially greater than that of said first signal and comprising a first transistor having its emitter connected in operation to said second terminal of said source, a high overvoltage coefficient inductance, arranged in the collector circuit of said first transistor with its first terminal directly connected to the collector of the first transistor and its other terminal connected to said first terminal of said source, a second transistor with its collector directly connected to the base of said first transistor, a polarizing resistor, a capacitor having first and second terminals, the first terminal being directly connected to the collector of said first transistor and the second terminal being directly connected to the base of said second transistor and to a terminal of said single element battery through said polarizing resistor, the other terminal of the battery being connected to the emitter of the said second transistor, and recitifier means to rectify the signal delivered at the terminals of said inductance.

8. Converter device according to claim 7, comprising regulator means to regulate the signal delivered by the rectifier means.

9. Converter device according to claim 8, wherein the regulator means comprise a capacitor and a Zener diode having its cathode connected to one terminal of the capacitor of the regulator means and its anode connected to the base of the second transistor.

10. Converter device according to claim 7, wherein said inductance comprises a coil and a core of ferrite on which said coil is wound.

11. Converter device as defined in claim 1, wherein said inductance is constituted by a coil wound on a ferrite core.

12. Converter device according to claim 11, wherein said core of ferrite forms a closed circuit.

13. Converter device according to claim 12, wherein said closed circuit has the shape of a torus.

14. Converter device as defined in claim 6, wherein the Zener voltage of said Zener diode is lower than the maximum voltage appearing at said one terminal of said inductance.

15. Converter device as defined in claim 5, wherein the regulator means comprises a capacitor connected to the output of said rectifier means and a Zener diode connected between the terminals of said capacitor of the regulator means.

16. Converter device as defined in claim 15, wherein the Zener voltage of said Zener diode is less than the maximum voltage appearing at the terminal of said inductance to which is connected said Zener diode.

17. Converter device adapted to transform a changing direct signal generated by a source of direct current, into a signal whose amplitude is substantially greater than that of said changing signal, at least for certain values of this signal, this device comprising a first transistor, and including, in combination, an inductance with a high overvoltage coefficient arranged in the collector circuit of said first transistor, so that one terminal of this inductance is directly connected to the collector of said transistor, a second transistor of which the collector is directly connected to the base of the first transistor, a connecting capacitor having first and second terminals, the first terminal being directly connected to the collector of the first transistor and the second terminal being directly connected to the base of the second transistor, and a polarizing resistance arranged directly between the base of the second transistor and one terminal of said source, wherein the transistors are of opposite conductivity type and the collector of the second transistor is connected only to the base of the first transistor.

* * * * *